United States Patent [19]

Levine

[11] 4,433,585

[45] Feb. 28, 1984

[54] DEVICE FOR MEASUREMENT OF THE TORSIONAL ANGULAR DEVIATION OF A LOADED ROTATING OR STATIC SHAFT

[75] Inventor: Joshua L. Levine, Ossining, N.Y.

[73] Assignee: North American Philips Corporation, New York, N.Y.

[21] Appl. No.: 333,072

[22] Filed: Dec. 21, 1981

[51] Int. Cl.³ .............................................. G01L 3/08
[52] U.S. Cl. ................................ 73/862.34; 356/356; 356/363
[58] Field of Search ............... 73/862.34, 862.33, 650; 356/356, 355, 358, 363

[56] References Cited

U.S. PATENT DOCUMENTS 3,196,675  7/1965  Buchele et al. ................. 73/862.33
3,938,890  2/1976  Flavell ............................ 73/862.33

FOREIGN PATENT DOCUMENTS 417051  9/1934  United Kingdom ............. 73/862.33

Primary Examiner—Donald O. Woodiel
Attorney, Agent, or Firm—Thomas A. Briody; William J. Streeter

[57] ABSTRACT

A torsional angular deviation measuring device comprising a first diffraction grating which is placed at one end of a shaft and a second diffraction grating placed at the other end or at least some distance from the first end. A beam of light from a light source is then passed through the first diffraction grating generating zeroth order and other order beams. The beams are thence passed through collimating optics and then through the second diffraction grating. The beams from the second diffraction grating are sensed by split photodiodes and the amount of angular deviation is then measured by comparing the phases of pulse trains generated from the different photodiodes with one another.

8 Claims, 6 Drawing Figures

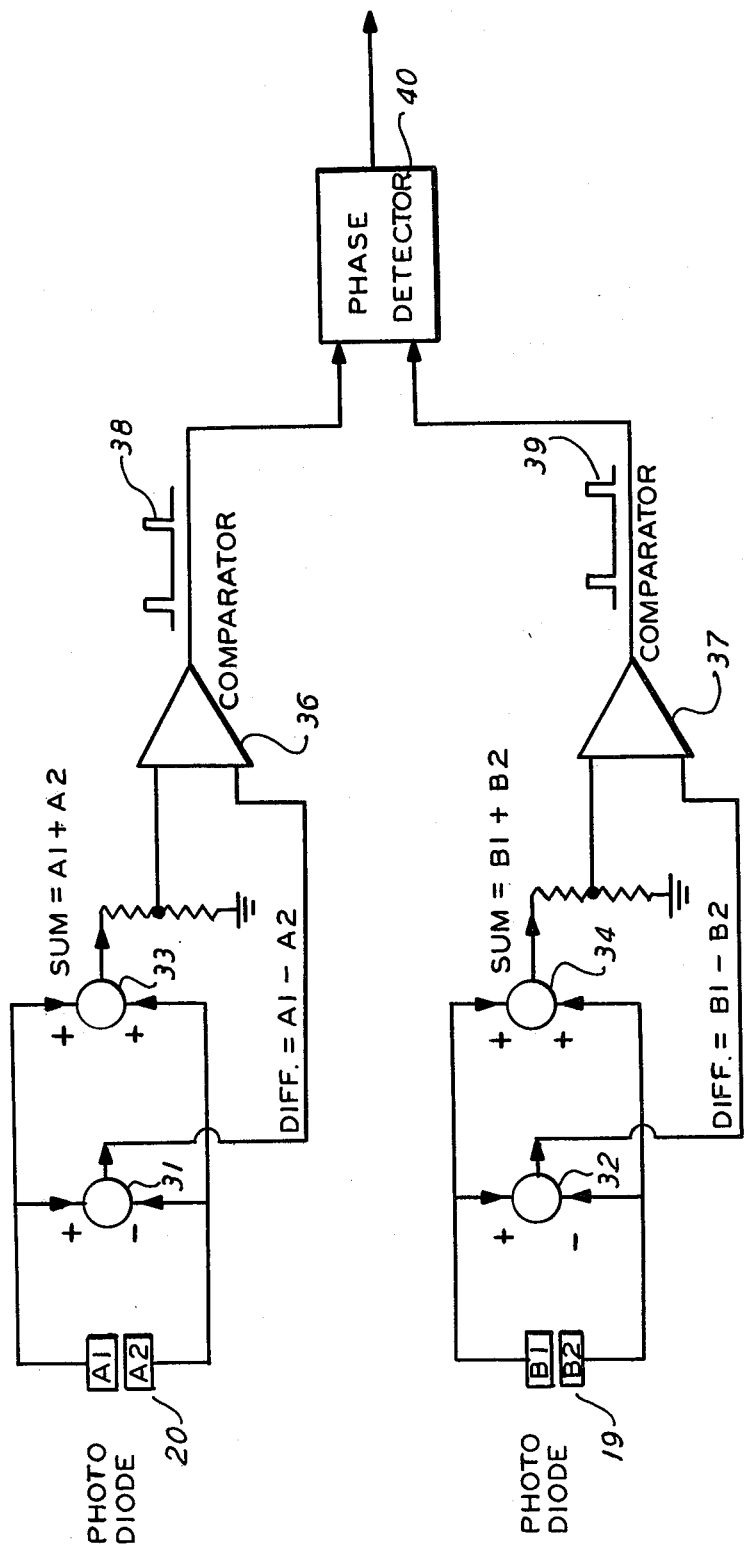

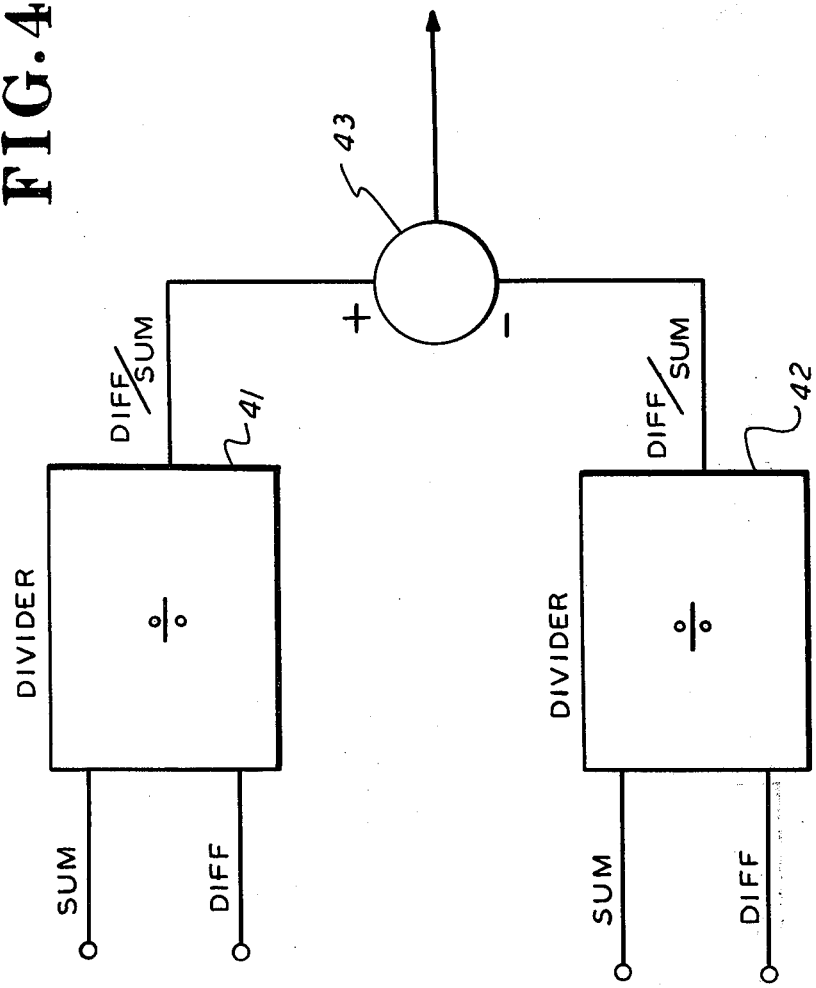

DEVICE FOR MEASUREMENT OF THE TORSIONAL ANGULAR DEVIATION OF A LOADED ROTATING OR STATIC SHAFT

This invention is related to a device for measuring the torsional angular deviation of a loaded rotating or static shaft. More particularly, this invention is related to a torsional angular deviation device employing an optical diffraction grating device to measure torsional angular deviation.

BACKGROUND OF THE INVENTION

In the prior art one method of measuring torsional angular deviation employed potentiometers with sliding pick-offs. Other methods employed inductive or capacitive measuring devices. These prior art devices all had the disadvantage that the moving parts must be rigidly supported free from lost motion since the output signal is markedly dependent on the position of the moving system. In addition, the support must be arranged to exclude all translatory movements of the measuring system, particularly at right angles to its axis of rotation. In order to avoid the disadvantages referred to, complex and expensive electronic and optical devices have been proposed. The present invention provides a non-contact measurement of torsional angular deviation of a shaft even in the presence of shaft bending.

OBJECTS OF THE INVENTION

Accordingly, it is an object of the invention to provide an optical device to measure torsional angular deviation of a shaft.

It is a further object of the invention to provide an optical device for measuring the torsional angular deviation even in the presence of shaft bending.

It is yet a further object of this invention to provide an optical device wherein there is no physical connection between the measurement generating and detection systems.

SUMMARY OF THE INVENTION

The invention teaches a method and a device for measuring the torsional angular deviation of a shaft by placing a first diffraction grating on a first end of the shaft and a second diffraction grating on the other end of the shaft. A source of light impinges upon the first diffraction grating which emits zeroth order and first order beams. These beams are passed through collimating optics and are detected by a pair of split photodiodes after passing through the second diffraction grating. The signals from the two detectors are further processed in summing and differencing networks and then applied to a separate comparator for each photodiode. A phase detector detects the phase difference between the pulse trains from the comparators and provides a signal which is proportional to the torsional angular deviation of the shaft.

BRIEF DESCRIPTION OF THE DRAWINGS

FIG. 3 shows a schematic of the summing and difference networks, the comparators and the phase detector used to detect the phase difference between the output signals from the photodiodes, and FIG. 4 shows a circuit configuration for measurement of a static loaded shaft.

DETAILED DESCRIPTION OF THE PREFERRED EMBODIMENTS

Figure 1:
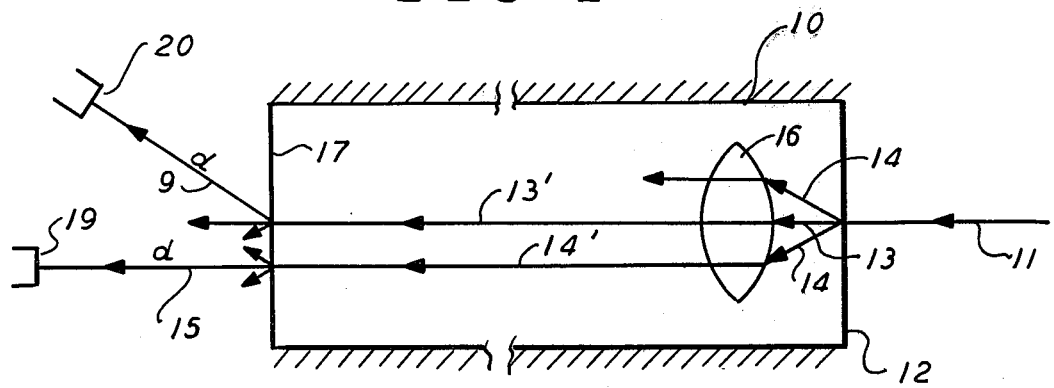
FIG. 1 is an illustration of the proposed measuring device used with a rotating shaft.

FIG. 1 illustrates the principle of the proposed measurement device as used with a rotating shaft. In FIG. 1, rotating shaft 10 may be a hollow cylindrical shaft which might, for example, be a motor shaft. A source of light 11 is incident on a first transmission diffraction grating 12 which may be attached at either the loaded or the driven end of shaft 10. In general, a light beam passing through a diffraction grating will produce a multiplicity of beams at the output. Beams 13 and 14 are shown as examples of the beams produced by diffraction grating 12. Beam 13 emerges parallel to the incident beam and is called the zeroth order beam and the other beams 14, emerging at an angle to beam 13 are called the first order beams. The beam angles are related to the wavelength of the incident light beam, the grating period, and the refractive index of the material through which the incident light passes. For simplicity of explanation and because it is possible in practice to restrict most of the light energy emerging from the diffraction grating to the zeroth order beam 13 and the first order beams 14, only these are shown in FIG. 1. In principle, any of the other orders (second, third, etc.) could be used in conjunction with the zeroth order.

Following diffraction grating 12, collimating optics 16 are used. Again for simplicity a single lens is shown but it will occur to those skilled in the art that a more complicated collimating optical system could be used. Collimating optics 16 and diffraction grating 12 may be part of an assembly which keeps these components in a fixed relationship to each other. Also the assembly itself may be threaded and screwed into the end of the shaft. Only one of the first order beams 14 is needed and depending on the system specifics, the other beam may be blocked with a stop or allowed to pass. The zeroth order beam 13' and the first order beam 14' emerge from collimator 16 parallel to each other. The two beams impinge on a second diffraction grating 17 which in general, need not be physically the same as diffraction grating 12. Beams 13' and 14' are diffracted by diffraction grating 17. FIG. 1 shows that the first order beam 14 generated in diffraction grating 12 generates a zeroth order beam 15 in passing through diffraction grating 17 and is incident on detector 19. The zeroth order beam 13 generated in diffraction grating 12 generates a first order beam 9 in passing through diffraction grating 17 and is incident on detector 20. The other orders may be blocked or allowed to pass depending on the design of the system. Here again, other beam orders may be used.

Figure 2A:
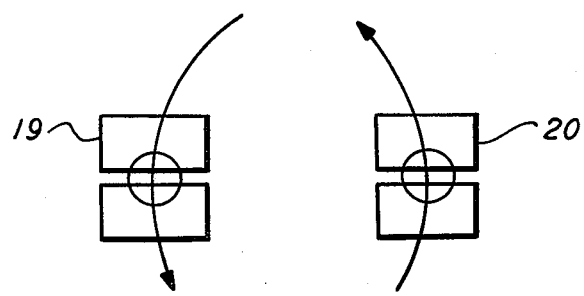
FIGS. 2A, 2B and 2C are schematic illustrations of split photodiodes used in the invention.
Figure 2B:
Figure 2C:
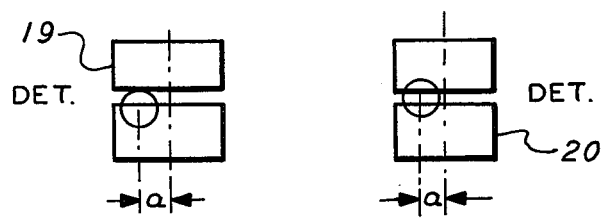

FIGS. 2A, 2B and 2C show details of detectors 19 and 20 which are both split photodiodes. Both detectors are shown as being positioned a distance "d" from diffraction grating 17. In the general case the distances need not be equal as long as their ratio is known. Referring to FIG. 2A and assuming that the shaft is stationary and unloaded, then diffraction gratings 12 and 17 and photodiodes 19 and 20 may be aligned such that the beams fall centered on the photodiodes (i.e. equal light energy on each side of the diode gap). When the shaft is rotating each beam will trace out a circular path in the plane of its respective photodiode. If the diode signals are processed as in FIG. 3, then a pulse train will be obtained from each of comparators 36 and 37. The pulses are generated as the light beams sweep across photodiodes 19 and 20. Comparing the difference signal against a fraction of the sum signal makes the comparison triggering point independent of photodiode sensitivity and light intensity variations. The difference signal for photodiode 20 is obtained through difference network 31 and the fractional sum signal is obtained for photodiode 20 through fractional summing network 33. Similarly, the difference signal for photodiode 19 is obtained from difference network 32 and the fractional sum signal for photodiode 19 from fractional summing network 34. The output signals from networks 31 and 33 are applied as separate inputs to comparator 36. Similarly, the output signals of networks 32 and 34 are applied as separate inputs to comparator 37. The pulse trains 38 and 39 which emerge from comparators 36 and 37, respectively, are of equal frequency. They are next phase compared in phase detector 40. Imperfect alignment of diffraction gratings 12, 17 and photodiodes 19 and 20 may yield some phase difference in the unloaded shaft condition but this simply results in an offset which may be nulled out and is of no significant consequence.

When torque is applied to shaft 10, one end will develop an angular deviation with respect to the other end. This rotates diffraction grating 12 with respect to diffraction grating 17 causing a shift in the beam position which in turn causes a phase shift between the derived pulse trains 38 and 39 that is proportional to the torsional angular deviation of the shaft. The shift in beam position is illustrated in FIG. 2B. This is then the basic measurement principle. It should be noted that the technique is applicable to other than hollow shafts, since the measurement system could be fitted to the outside of a solid shaft. Also the two gratings need not be at the very ends of the shaft. They may be placed at other positions along the shaft and at distances from each other dictated by system design considerations.

With knowledge of the torsional angular deviation, the torque loading on the shaft can easily be calculated since the two quantities are related by the torsional modulus of the shaft material. The derived pulse trains are a measurement of the shaft rotational velocity. With torque and velocity known, the delivered shaft power can be calculated.

In the case of a torque loaded static shaft (non-rotating), the angular deviation can still be determined by using the split photodiode (or replacing it with a quadrant cell photodiode) as a position measuring device. The split photodiode or quadrant cell photodiodes may be replaced by lateral cell diodes if motions larger than the measurement range of these photodiodes are anticipated. FIG. 4 illustrates a condition of a static loaded shaft. In lieu of the comparators 36 and 37 of FIG. 3 the outputs of the network 31 and 33 are applied to analog divider 41. Similarly, the outputs of networks 32 and 34 are applied to analog divider 42. Analog dividers 41 and 42 provide difference over sum signals to network 43 which in turn provides a signal output which is proportional to the difference in beam positions on photodiodes 19 and 20.

In many situations the loading of the shaft produces not only a torque but also bending. The proposed measurement technique is self compensating so that the effects of shaft bending do not disturb the measurement of the torsional angular deviation. When diffraction grating 12 and collimator 16 system is bent with respect to the incident beam, the beams exiting collimator 16 may be shifted in position but will still be collimated. This is a function of the amount of bending and the nature of the collimator design. The end result is that the beam falling on detectors 19 and 20 will be displaced by equal amounts as shown in FIG. 2C so that there will be no phase shift introduced between the two resultant pulse trains due to the bending. In a practical application the beam displacements on the photodiodes will not be precisely equal but the differences can be minimized by proper collimator design. The relative insensitivity to bending is a principle feature of the measurement system. Note also that the system compensates for changes in the angle and position of the incident light beam.

In the loaded, non-rotating situation, compensation is also achieved because the amount of motion measured by detector 20 can be subtracted from detector 19 to give the true motion due to torsional angular deviation.

While there has been described what is at present considered to be the preferred embodiments of this invention, it will be obvious to those skilled in the art that various changes and modifications may be made therein without departing from the invention. And it is, therefore, intended to cover all such changes and modifications as fall within the true spirit and scope of the invention.

What is claimed:

1. Apparatus for measuring torsional angular deviation of a member subject to torsional forces comprising first and second diffraction means mounted in spaced apart relationship to said member, a source of light, light from said source being diffracted into a first plurality of zeroth and higher order beams by said first diffraction means, the zeroth and at least one higher order beam of said first plurality of order beams being further diffracted by said second diffraction means into a second plurality of order beams, the relative positions of at least two of the order beams of said second plurality of order beams providing a measure of the torsional angular deviation of said member.

2. The invention of claim 1 further comprising collimating means located between said first and second diffraction means for parallelizing at least two order beams of said first plurality of order beams before further diffraction by said second diffraction means.

3. The invention of claim 2 further comprising first and second detectors for detecting the positions of said at least two order beams of said second plurality of order beams and producing detector output signals in response thereto, and circuit means connected to said detectors for receiving said detector output signals and producing in response thereto a signal indicative of the torsional angular deviation of said member between said first and second diffraction means.

4. The invention of claim 1 further comprising detection means for detecting the relative positions of said at least two order beams of said second plurality of order beams and providing an output signal representative of the torsional angular deviation of said member.

5. The invention of claim 1 further comprising first and second detectors for detecting the positions of said at least two order beams of said second plurality of order beams and producing detector output signals in response thereto, and circuit means connected to said detectors for receiving said detector output signals and producing in response thereto a signal indicative of the torsional angular deviation of said member between said first and second diffraction means.

6. Apparatus for measuring torsional angular deviation of a member comprising:

a source of light;

first diffraction means mounted to said member for diffracting light from said source into a plurality of order beams;

collimating means for rendering parallel at least two of said plurality of order beams from said first diffraction means;

second diffraction means mounted to said member in spaced relationship to said first diffraction means for receiving said parallel beams from said collimating means and diffracting said parallel beams into a second plurality of order beams;

first detector means for detecting a first one of said second plurality of order beams at a first diffraction angle with respect to said second diffraction means and producing a first detector signal in response thereto;

second detector means for detecting a second one of said second plurality of order beams at a second diffraction angle with respect to said second diffraction means and producing a second detector signal in response thereto;

means coupled to said first and second detector means for receiving said first and second detector signals and producing a signal indicative of the torsional angular deviation of said member between said first diffraction means and said second diffraction means.

7. A method for measuring the torsional angular deviation of a member comprising the steps of:

(a) directing a source of light upon a first diffraction means mounted to a member subject to torsional forces to produce a first plurality of order beams;

(b) collimating at least two order beams of said first plurality of order beams;

(c) directing at least two collimated order beams of said first plurality of order beams upon a second diffraction means mounted to said member in spaced relationship to said first diffraction means to produce a second plurality of order beams;

(d) detecting the relative positions of at least two of the order beams of said second plurality of order beams to thereby provide a measure of the torsional angular deviation of said member between the first and second diffraction means.

8. The method of claim 7 wherein the step of detecting the positions of said at least two of the order beams of said second plurality of order beams comprises detecting the same with photoelectric detectors to produce detector output signals in response to said positions; and further comprising the step of processing said detector output signals to produce a signal indicative of the torsional angular deviation of said member.

* * * * *